Oct. 4, 1960     E. S. TUPPER     2,955,044
MEMBRANOUS SHAPE-SUSTAINING RECEPTACLES
Filed Dec. 18, 1956     6 Sheets-Sheet 1
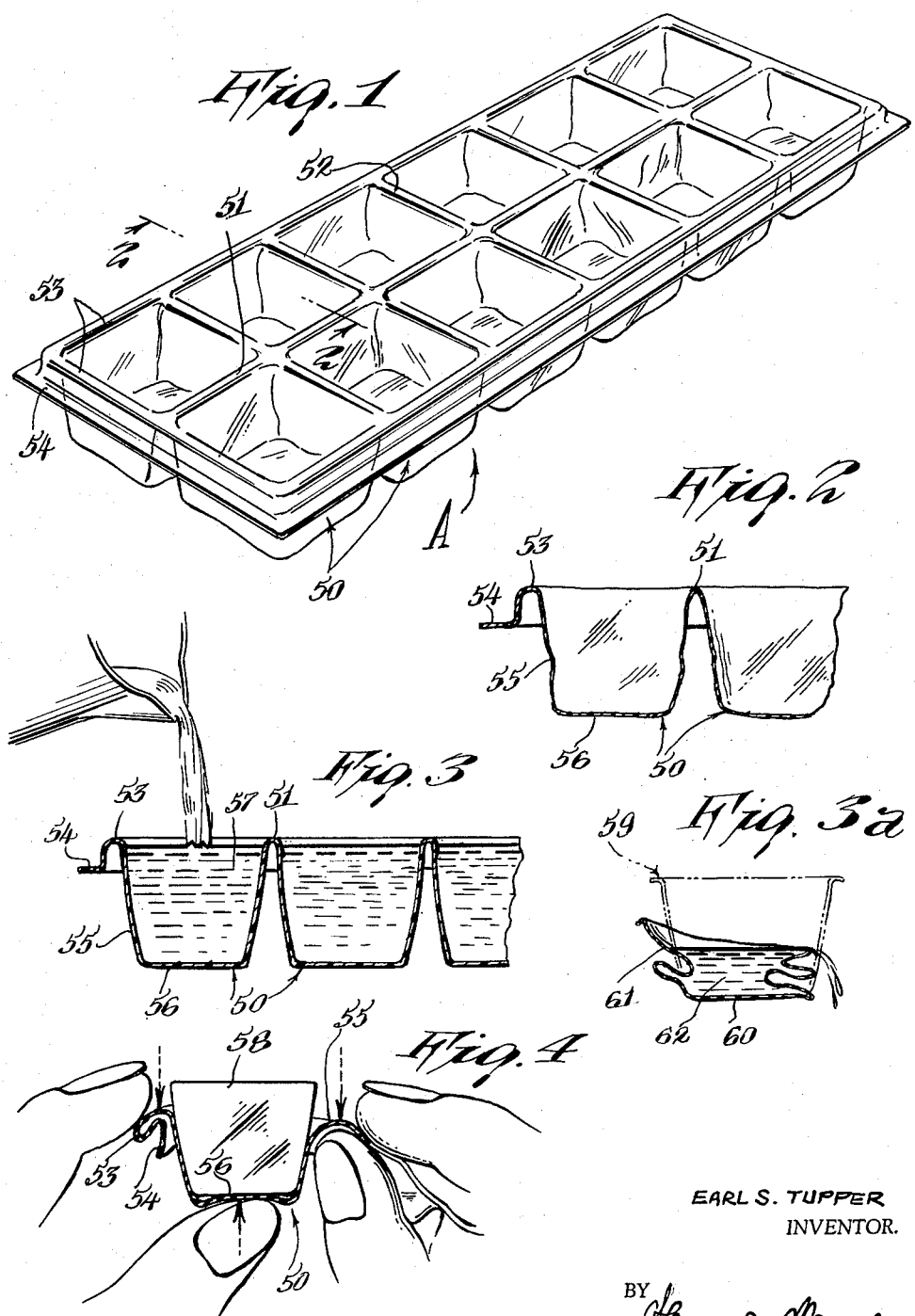
EARL S. TUPPER
INVENTOR.
BY
ATTORNEY

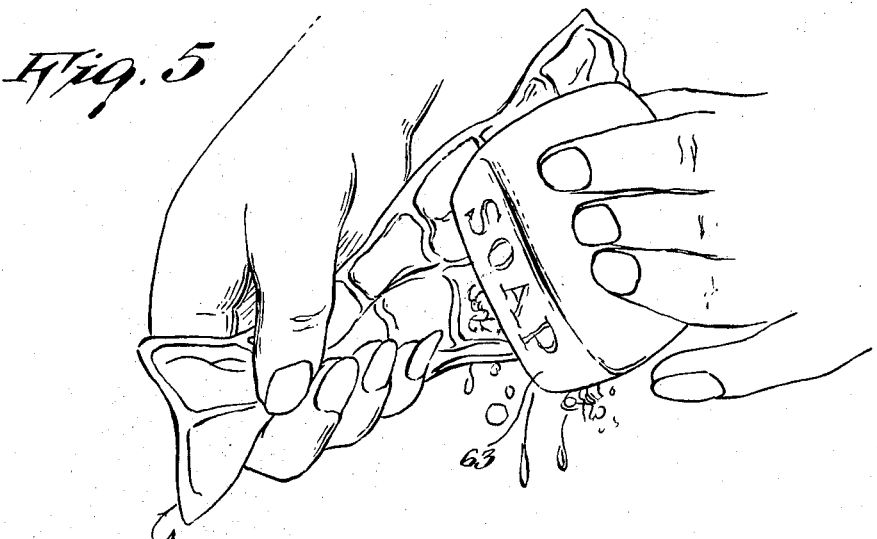
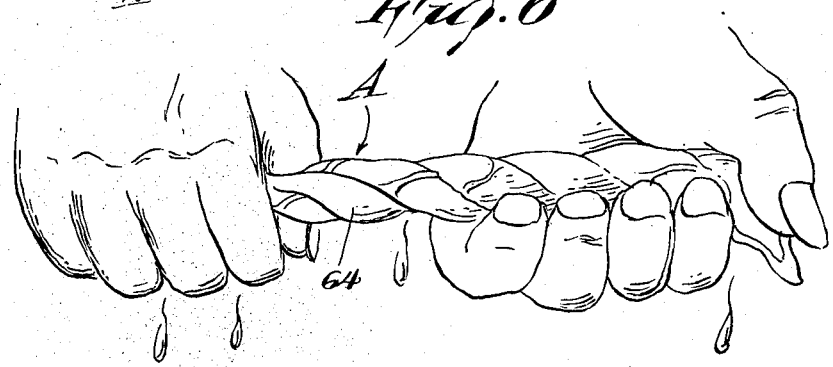
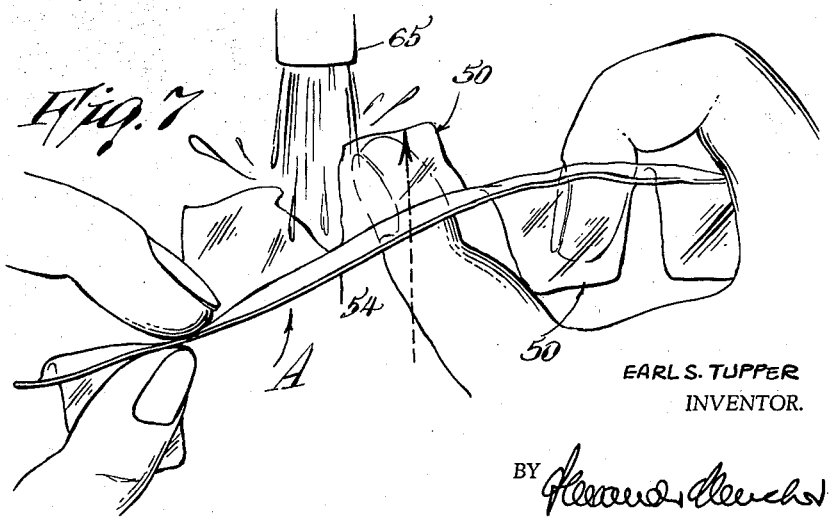

Oct. 4, 1960     E. S. TUPPER     2,955,044
MEMBRANOUS SHAPE-SUSTAINING RECEPTACLES
Filed Dec. 18, 1956     6 Sheets-Sheet 3
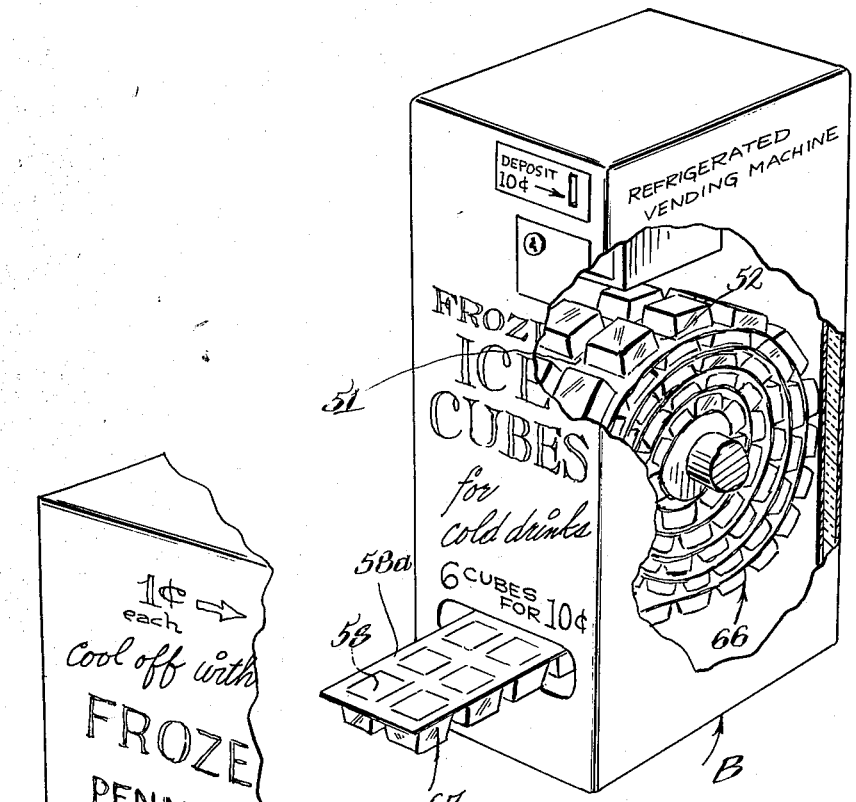
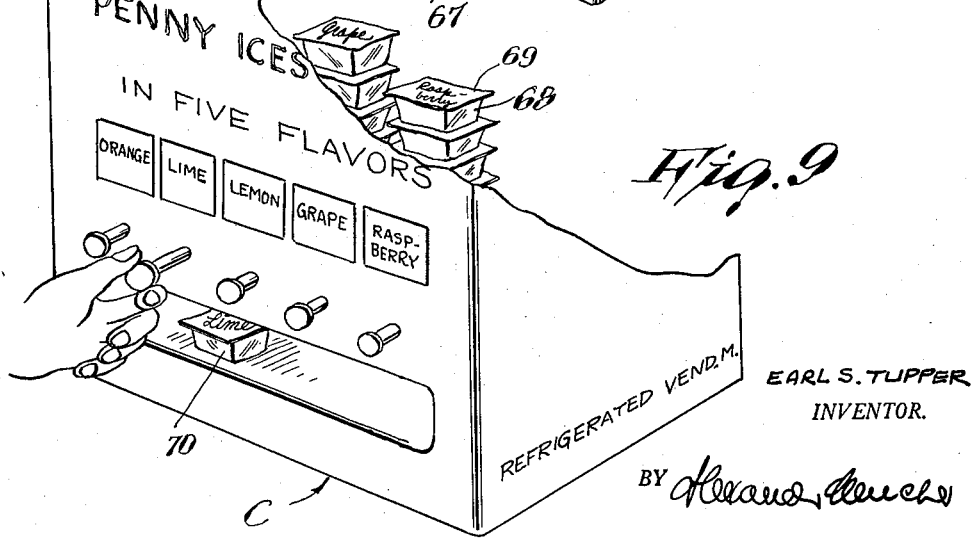
EARL S. TUPPER
INVENTOR.
BY
ATTORNEY Oct. 4, 1960      E. S. TUPPER      2,955,044
MEMBRANOUS SHAPE-SUSTAINING RECEPTACLES
Filed Dec. 18, 1956      6 Sheets-Sheet 4
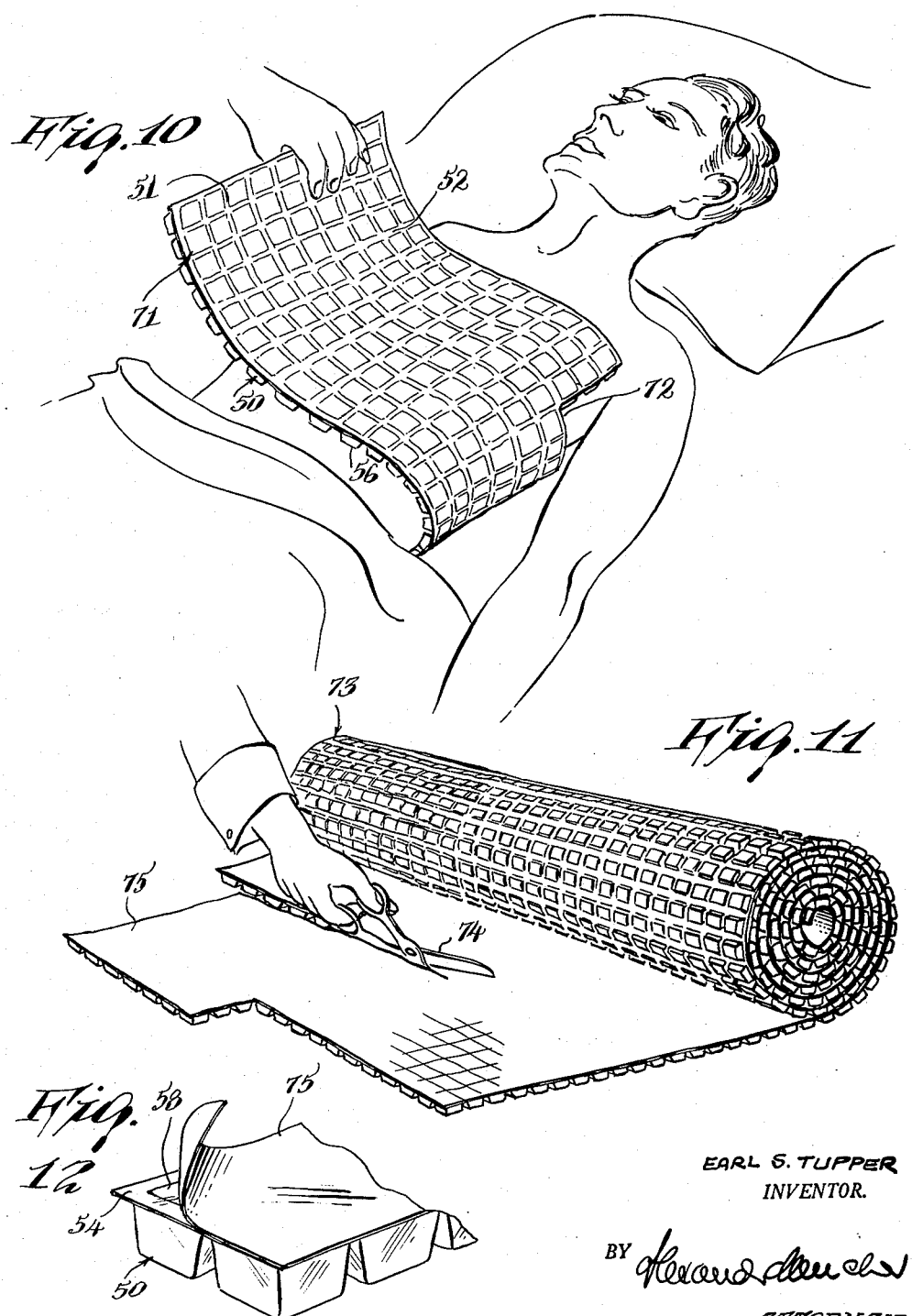
EARL S. TUPPER
INVENTOR.
BY
ATTORNEY Oct. 4, 1960               E. S. TUPPER               2,955,044
MEMBRANOUS SHAPE-SUSTAINING RECEPTACLES
Filed Dec. 18, 1956               6 Sheets-Sheet 5
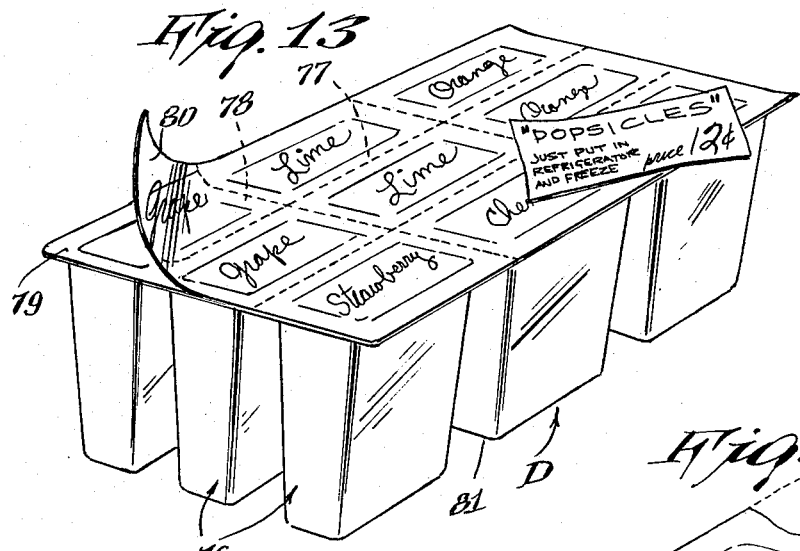
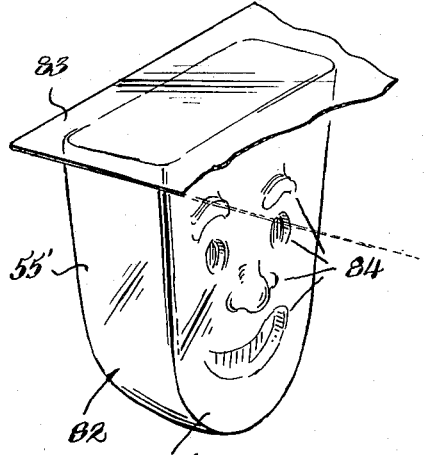
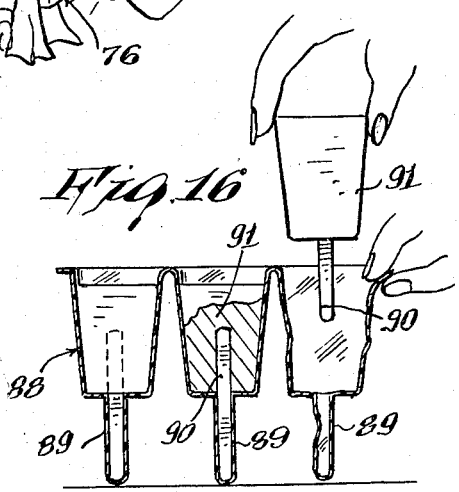
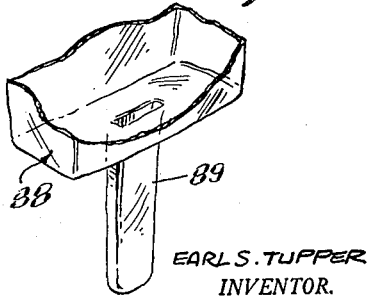
EARL S. TUPPER
INVENTOR.
BY
ATTORNEY Oct. 4, 1960    E. S. TUPPER    2,955,044
MEMBRANOUS SHAPE-SUSTAINING RECEPTACLES
Filed Dec. 18, 1956    6 Sheets-Sheet 6
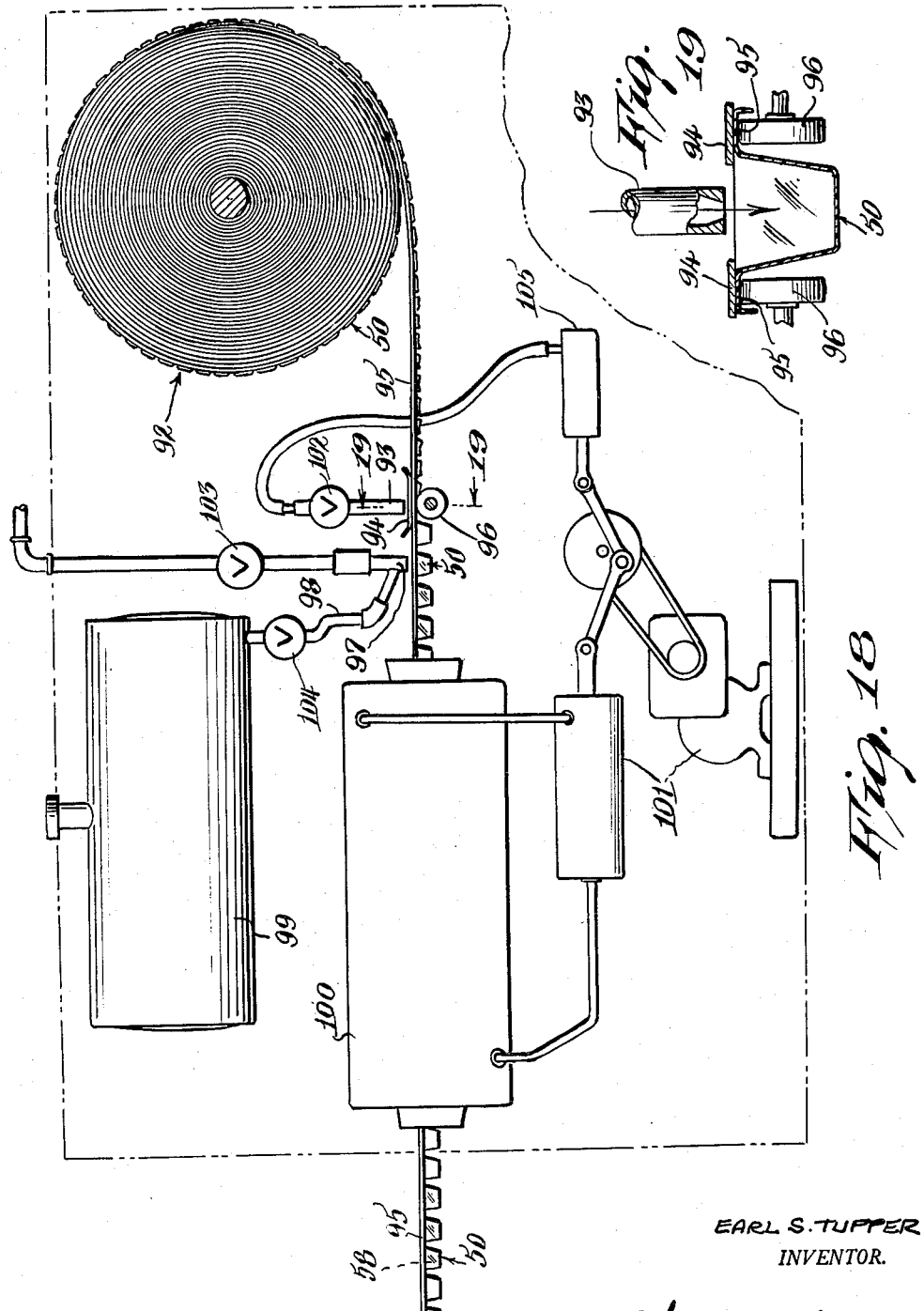
EARL S. TUPPER
INVENTOR.
BY
ATTORNEY United States Patent Office 2,955,044
Patented Oct. 4, 1960

2,955,044

MEMBRANOUS SHAPE-SUSTAINING RECEPTACLES

Earl S. Tupper, Esmond, R.I., assignor to Tupper Corporation, North Smithfield, R.I., a corporation of Delaware Filed Dec. 18, 1956, Ser. No. 629,156

5 Claims. (Cl. 99—171)

This invention relates generally to resilient, flexible and deformable throw-away or reusable single and linked or articulated multi-cavity formers or molds, but more specifically to molds formed of definitive materials and having wall thicknesses to yield such general characteristics as: (a) hardening or ready congelation of contents therein; (b) mold capacity for peeling back on itself the wall or walls thereof for mold inversion to effectuate removal of the molded or frozen contents without mold destruction, and capacity of mold to reassume original shape for reuse; (c) capacity of the mold when of extremely fine gauge to acquire a holding shape when contents are poured therein for freezing purposes; (d) easy production, handling, cutting, filling and dispensing.

An important object of the invention, therefore, resides in the structure of a cavity mold, either or both in single and plural form, which is normally self-sustaining in shape when both empty and filled with contents for congealing or freezing purposes. The structure furthermore is formed of a material, such as polyethylene or other plastic having similar physical characteristics, which is capable of affording inversion to the mold by a peeling operation for removal of the frozen or congealed contents without damage for substantial return and reuse of the original shape. In addition, the gauge of the mold walls and the gauge of the connecting runs when in plural form afford the mold to be hand scrubbable, hand wringable, crushable and washable, the resiliency of the mold material and the mold shape permitting same to be shaken back into original shape for reuse.

A further object of the invention resides in the provision of a mold formed from a flexible and deformable plastic material, of a range of gauges to permit easy freezing of contents therein, peeling back of the mold walls and inversion of the mold for removal of the frozen or formed product, of sufficient stiffness for self maintenance of shape against forces of gravity and of a specific gravity less than the fluid contents for maintenance of mold shape to contain the fluid contents when the mold is of exceedingly fine gauge. Such type of mold is of the throw-away or reusable type, being capable of assuming its original shape by hand manipulation for reuse.

Another object of the invention resides in the provision of a plural cavity mold formed of flexible and deformable plastic material of a gauge which is compatible for inversion and for return to original form wherein the cavities are joined at the upper edges by integral and intersecting web runs which serve as fold areas subject to be resiliently flexed. Such type of mold consequently is capable of being formed in a continuous process; capable of being stacked in straight or curved overlying strips when cut or in folds without injury to the form or shape of the individual cavities; capable of being wound in a continuous roll or bolt for storage without injury to the form or shape of the individual cavities; capable of being dispensed from dispensing machines or from yardage in desired joined or single cavity mold quantities.

A further feature of the invention resides in the provision of a plural cavity mold which permits machine or hand filling of fluid contents adapted to be frozen; a continuous freezing process therefor; storage thereof with the frozen contents in flat or curved overlying strips or folds, or wound in the form of a continuous roll or bolt.

Such plural or multi-cavity mold with frozen contents, moreover, is capable of being dispensed from dispensing machines in preselected joined or single cavity mold quantities. Furthermore the plural cavity mold with frozen contents therein is conformable to any geometric surface by virtue of linkage or the articulation afforded by the intersecting foldable runs joining the cavities and may be applied to the body as a dry chilling blanket, or for purposes of chilling food containers and the like. Where the individual cavities are of the same size and of the same frozen content such as ice cubes, uniform chilling per unit area is effected.

Another object of the invention is to provide a locally deformable, self-sustaining membranous mold capable of receiving contents which are readily freezable when exposed to refrigeration; capable of use as a handling covering when eating the contents such as a frozen pop or frozen confection by peeling the walls of the mold back for inversion as the confection is being consumed, said mold being thereafter thrown away or reserved for reuse.

Another feature of the invention resides in the provision of locally deformable and flexible membranous plastic molds of a thin gauge compatible for inversion, and stiff enough for sustaining cavity shape under effect of gravity whereby there results a reduction in manufacturing costs, less insulating resistance to refrigeration, faster cycles during molding operation.

Another feature of the invention resides in the provision of a flexible mold or former capable of having undercuts and being easily strippable from the producing mold, the frozen product within said mold also being easily removed therefrom by a peeling operation.

Another feature of the invention resides in the provision of membranous molds of such type having a minimum shape sustaining stiffness and which is invertible, non-clingable, impermeable, and locally deformable.

Other features of the invention will hereinafter appear in the progress of the disclosure and as pointed out in the appended claims.

In the accompanying drawings are illustrated various embodiments of the invention wherein:

Figure 1 is a view in perspective of one form of the invention showing a plural cavity mold unit for forming ice cubes or molding any type of food product including jello, custard and the like;

Figure 2 is a fragmentary sectional view showing linked cavities of the mold unit of Figure 1 and illustrating a stiffness for shape maintenance against force of gravity, said view being across plane 2—2 of Figure 1;

Figure 3 is a view similar to Figure 2 showing cavity capacity to receive and maintain fluid contents;

Figure 3a shows a cavity mold form in perspective of thin gauge normally unable to maintain its shape, and showing a spill-over when filled with fluid contents of greater specific gravity than the mold material, said mold being of a thin "latex" of specific gravity less than one;

Figure 4 is a view in perspective showing how a frozen cube may be removed from the mold by a peeling back operation;

Figure 5 is a view in perspective showing how the plural cavity mold of Figure 1 may be washed and scrubbed with soap;

Figure 6 is a view in perspective showing how the mold of Figures 1 and 5 is or may be hand wrung;

Figure 7 is a view in perspective showing how the individual cavities of the mold of Figure 1 may be inverted for washing purposes under a spigot;

Figure 8 is a view showing how a roll of a continuous plurality cavity mold material with contents already frozen is capable of being vended from a coin machine or ice-cube dispenser;

Figure 9 is a fragmentary view in perspective showing how single cavity molds may be dispensed with frozen confections therein from a coin machine;

Figure 10 is a view in perspective showing application of a body fitting blanket of plural cavity mold material containing frozen contents is wrapped around the body of an individual for uniform temperature lowering;

Figure 11 is a view in perspective showing one method of cutting plural cavity mold material from a bolt or roll having a covering over the cavity mouth side and having frozen contents;

Figure 12 is a fragmentary view in perspective showing a corner of a plural cavity mold unit provided with a removable covering and frozen contents;

Figure 13 is a view in perspective showing a plural cavity mold filled with a frozen confection and covered with a removable film, the shape of the mold being such as to be able to stand for filling purposes as a unit as contrasted to inability of each cavity portion to stand on the reduced bottom area.

Figure 14 is a view in perspective showing a single cavity mold with frozen contents having undercuts following undercuts in mold;

Figure 15 is a view in perspective showing consumption of a frozen confection while in the mold, the mold walls being peeled back for exposure during consumption in a progressive manner;

Figure 16 is a view in section of a plural cavity mold to serve as a holder for receipt of a congealable confection and a holding stick formation, said view illustrating a mold having a frozen confection with a stick attached and removed therefrom;

Figure 17 is a fragmentary view in perspective and partly in section showing the bottom of an empty single mold cavity illustrated in Figure 16;

Figure 18 is a diagrammatic view of a roll or bolt of plural cavity mold material being fed to blowing, filling and freezing apparatus as a line assembly process for commercial production of ice cubes and confections;

Figure 19 is a sectional view of Figure 18 across the plane 19—19 thereof.

In accordance with the invention and the illustrative forms shown, Figures 1–7 show a type of plural cavity mold cuttable by knife, scissors or other means into individual cavity molds both before and after congelation of the contents and of such characteristims as to have the cavity walls capable of being peeled back upon themselves for inversion to remove the congealed or frozen contents, and to have the whole plural cavity mold washable, wringable and squeezable with substantial return of the original shape by hand shaking and hand manipulation without any destructive effects.

Such type of mold necessarily should be of membranous gauge and have a minimal stiffness to be substantially self supporting in shape. It has been found that where the mold material is of a specific gravity less than one, or less than the specific gravity of the fluid contents, thinner gauges and less self-sustaining stiffness in the material are required since the fluid contents have a tendency to fill out the mold cavity since the walls have a floating effect thereon.

It has been found that to form this type of mold, inert, locally deformable plastic material such as polyethylene or other plastic having similar physical characteristics is most suitable to furnish such required characteristics as peelability, impermeability, invertibility, stability, strength, minimal stiffness, elasticity and preferred specific gravity.

It has further been found that to effectuate suitable cavity molds to accomplish the above stated ends and to permit fast cycles and economy of production and susceptibility to quick freezing, the mold cavity walls may vary in thickness in any suitable range up to ten mils or more depending upon requirements such as the specific gravity of the filler.

Referring to Figure 1, there is shown a plural cavity mold generally designated by letter A and consists of a plurality of similar mold cavities 50, the upper edges of which are joined by intersecting web runs, the longitudinal run being indicated by numeral 51 and the transverse run by 52. As shown, extending off the free rounded edges 53 of the outside mold cavities there is a peripheral flange 54.

Production-wise, a plural cavity mold such as A is preferably formed by vacuum drawing, the runs 51, 52, edges 53 and flange 54 being formed from the undrawn heated sheet stock while the cavities are formed from a drawing of the heated sheet stock against the mold die. It is of course understood that other known forming or molding techniques including blow molding may be used for production.

In Figure 3 is shown a portion of plural mold of Figure 1 wherein the walls 55 and 56 of each cavity 50 are filled out by introduction of fluid 57 prior to freezing such as water in contrast with the somewhat irregular appearance of walls 55 and 56 shown in Figure 2. The surface of the fluid should be below the top edges of the cavity mouth. In Figure 4 is shown a frozen mold product such as ice cube 58 within a cavity 50 in process of removal. Thus, the frozen product or ice cube may be removed by peeling back wall 55 on itself as shown toward inversion of the cavity while finger pressure is exerted at the same time on bottom wall 56.

In Figure 3a is illustrated a form of single cavity mold, the shape thereof when blown out or hand supported being indicated in phantom by numeral 59, said mold being membranous, equal in gauge to mold cavity 50 and lacking sufficient stiffness to be self-sustaining. Cavity mold 59 is formed of flexible and deformable material such as "latex" or other material of specific gravity greater than one having a bottom wall 60 and a side wall 61. When mold 59 is filled with water 62 and hand support removed, the mold collapses with spill-over as shown in Figure 3a in contrast to the self-sustaining cavity mold 50 of Figure 2 and the filling out thereof when water is added shown in Figure 3.

In Figures 5–7, the plural mold cavity A of Figure 5 is shown as being hand manipulated for cleaning purposes in the manner of a cloth. Thus, Figure 5 shows application of soap 63 to plural mold cavity A in a crushed position; Figure 6 shows a hand-wringing operation for removal of water or cleaner therefrom, the plural mold cavity A assuming a twisted configuration indicated generally by numeral 64; Figure 7 shows inversion and shape maintenance of the individual mold cavities 50 when individual finger pressure is applied thereto for rinsing under a water faucet 65.

Figure 8 illustrates generally a coin operated ice cube dispenser generally indicated by letter B and containing therein a long and wide strip of plural mold cavity material encasing frozen cubes and with a film cover 58a all in a dispensable roll. The plural cavity material with the refrigerated cubes therein is shown by numeral 66 while the ejected and vended portion is indicated generally by numeral 67. As has been mentioned in connection with plural cavity mold A of Figure 1, the connecting web runs 51 and 52 permit articulation therealong with and without frozen contents and further permit cutting therealong for selected portions.

Figure 9 illustrates a coin operated vending machine C for dispensing confections frozen in the cavity mold of the invention. As shown, the individual molds within the machine are indicated by numeral 68, each being provided with a removable cover membrane 69 for sanitary purposes. The dispensed frozen confection shown in Figure 9 is indicated by numeral 70.

Figure 10 illustrates a stretch of plural cavity mold material generally indicated by numeral 71 containing refrigerated contents such as ice cubes cut to appropriate size and shape and applied as a uniform cooling jacket for a selectable body area of an individual. An armpit cut-out 72 illustrates pattern selectability. It is to be noted that the dry bottom wall 56 of each cavity touches the body and acts as the heat transfer area. Uniform chilling is thus effected.

Figure 11 illustrates roll of cavity mold material having refrigerated cavity contents and generally indicated by numeral 73 and from which stretch 71 has been cut as by scissors 74. A removable and cuttable membranous lining such as film 75 may be applied against the cavity-mouth side to guard against sticking of the successive turns in a roll or the successive layers when strips of plural cavity mold material containing ice cubes are piled on top of one another.

In Figure 13 is shown a plural cavity mold generally indicated by letter D of the same characteristics of mold A shown in Figure 1 but having a different shape and capacity. Thus, each individual mold is indicated by numeral 76 and has connecting longitudinal and transverse runs 77 and 78. Mold D as shown is provided with a peripheral and continuous mouth flange 79 and further has a membranous or removable film cover 80.

Mold D as shown in Figure 13 is capable of self support by reason of the plurality and distribution of mold bottom walls 81 despite the fact that each individual mold 76 could not by itself be self-supporting by reason of the area and shape of the bottom wall. Moreover, mold D is presented as capable of receiving congealable fluid contents for introduction in and support on a surface in a freezing chamber. After congelation, individual molds 76 may be cut along the runs 77 and 78.

Figure 14 depicts a single cavity mold 82 having congealed contents and as severed from a plural cavity mold having a continuous and peripheral mouth flange 83. Mold 82 is shown as having undercuts in a face configuration 84 to indicate the versatility of the mold. By reason of the flexibility, deformability and invertibility of the mold walls 55' and 56', such undercoats 84 do not affect the removal of the congealed contents within the mold. By the same token, in the formation of the cavity mold itself, undercuts in the die do not affect the ready and easy removal of the formed cavity mold.

In Figure 15 is shown use of a single mold cavity 76 as a casing and sanitary holder for consumption of confection 85 frozen therein. As child 86 consumes the contents, the side walls 87 of the mold are peeled back against themselves for progressive exposure of the confection. Finally, the mold walls will be inverted and may be so discarded or cleaned, reinverted and used again.

In Figures 16 and 17 a type of cavity mold 88 is shown adapted to receive congealable contents and also having a lower, depending and communicating mold cavity 89 for enclosing a stick or rod 90. Thus, by first introducing a stick 90 in mold portion 89 and thereafter filling mold portion 88 with a congealable fluid, a frozen confection 91 having a handle may be provided all encased as shown in the first two mold showings in Figure 16. This type of compound mold may be used as a package for shipping, storage and during consumption of contents. For consumption, the operator holds mold portion 89 containing stick 90 and folds or peels back the walls of mold portion 88 progressively. As depicted in the third mold showing in Figure 16, frozen confection 91 is shown with stick 90 totally removed from a compound mold 88—89 if and when desired.

The plural cavity mold having the characteristics described lends itself to line production of continuous lengths and widths and to storage by reason rollability, foldability and non-destructive crushability.

Figures 18 and 19 depict diagrammatically a form of line production in the filling and congelation of a plural cavity mold. Thus, a roll of plural cavity mold material 92 may be fed through a blower, filling apparatus and freezer for production of ice cubes or frozen confections on a commercial scale and then rolled, cut or packed for storage (see Figures 8, 9 and 11).

Roll of mold material 92 passes under blower tubes 93 disposed above and intermediate pairs of spaced presser feet 94—94 to engage longitudinal pairs of cavity material runs 95—95 riding on pairs of rollers 96—96 as best seen in Figure 19. Air from blower tubes 93 fill out each of the mold cavities 50 prior to positioning under filler tubes 97. The reason for this is that the cavities 50 are somewhat flattened in the rolled-up position shown in Figure 18.

Filler tubes 97 may contain water for ice-cube production or may also have flavoring tube branches 98 emanating from a flavoring reservoir 99.

Numeral 100 indicates generally a freezer into which the filled mold material is fed for congelation, said freezer being operated by a motor driven compression system generally indicated by numeral 101. Air tubes 93 are provided with automatic valves 102, while water and flavoring valves are indicated by valves 103 and 104 respectively. Air tubes 93 may be fed from air compressor 105 driven by the compression system 101. The mold material with congealed contents issues from freezer 100 and is then rolled, cut, folded or otherwise stocked up. A covering film (not shown) may be applied to the frozen stock as it issues from the freezer and before being stocked up (Figure 11).

The various forms and characteristics of the membranous type of mold described have home, commercial and industrial use. The deformable, flexible, and impermeable characteristics thereof with articulable runs, and the minimal stiffness of the polyethylene or similar plastic material when of extremely thin gauge coupled with the specific gravity thereof (less than one) contribute to the structural features of the embodiments of the invention. Such features enable economical production of continuous lengths and widths of mold fabric, economical storage thereof without destruction, and economical filling and congelation of the mold cavities for frozen stocks to be machine or hand dispensed.

I wish it understood that variations in material, shape, capacity, integration, gauge, methods of production, filling, using and dispensing of the invention may all be resorted to without departing from the spirit of the invention as described and from the scope of the appended claims.

It is also understood that the individual or plural cavity molds may be used for receptacle and storage purposes regardless of congelation, casing, handling or wrapping function and that economy in production permits discarding thereof after use despite reusability thereof.

It is furthermore understood that congelation as used herein may indicate freezing such as water for ice cubes or mixtures for making ices and ice cream; hardening of gelatinous materials and the like; or it may indicate solidification of any degree and of any substance brought about by a temperature lowering, evaporation of solvent, oxidation, condensation or internal physical or chemical change.

It can thus be appreciated that the invention is applicable for all substances including candies and chocolates, custards, gels and foodstuffs which are moldable as a result of passage from one state of aggregation to another and wherein the congealed substance and the mold itself form a unitary product. Features of the invention lends it for wide use in transportation, commercial, domestic and industrial fields.

I claim:

1. A normally self-supporting, shape-retaining, deformable and substantially shape-reassumable unitary and membranous cavity mold formed of a plastic material having similar physical characteristics as polyethylene to afford the aforementioned characteristics of said cavity mold, comprising an open-mouthed mold cavity having walls forming the mouth of the mold, a peripheral flange for the mouth of the cavity and integrally joined to the said cavity walls, said cavity walls being drawn to membranous gauge and being sufficiently stiff as to be self-supporting and shape-retaining, and being finger-deformable, substantially shape-reassumable and invertible about the said flange, said flange being of higher gauge than the cavity walls and being resiliently flexible.

2. A normally self-supporting, shape-retaining, deformable and substantially shape-reassumable unitary and membranous cavity mold as set forth in claim 1 wherein the gauge of the cavity walls is below 10 mils.

3. A normally self-supporting, shape-retaining, deformable and substantially shape-reassumable unitary and membranous plural cavity mold formed of a plastic material having similar physical characteristics as polyethylene to afford the aforementioned characteristics of said plural cavity mold, and said mold being deformable, flexible, shape-conformable, cuttable, and shape-reassumable, comprising a plurality of spaced open-mouthed mold cavities each having walls forming the mouth of each of said cavities, intersecting webs forming peripheral flanges for and joining each of said cavities at the respective mouths thereof, each peripheral flange of a cavity being integrally joined to the walls thereof, said cavity walls of each cavity being drawn to membranous gauge and being sufficiently stiff as to be self-supporting and shape-retaining and being finger-deformable, substantially shape-reassumable and invertible about the corresponding peripheral flange, each of said peripheral flanges being of higher gauge than the corresponding cavity walls of each cavity and being resiliently flexible for flexing of the cavities thereabout.

4. A normally self-supporting, shape-retaining, deformable and substantially shape-reassumable unitary and membranous plural cavity mold as set forth in claim 3 wherein the gauge of the cavity walls is below 10 mils.

5. In a method of molding congealable edible substances in a cavity mold to form divisible products therewith, comprising utilizing a cavity mold having at least one cavity, said cavity having walls forming an open mouth, a peripheral flange for the mouth of the cavity and integrally joined to the said cavity walls, said cavity walls being drawn to membranous gauge and being sufficiently stiff as to be self-supporting and shape-retaining and being finger-deformable, substantially shape-reassumable and invertible about the said flange, said flange being of higher gauge than the cavity walls and being resiliently flexible, introducing a congealable substance in the cavity of the mold and congealing the same, said molded product after congelation being removable and ejectable by inversion and peeling of the cavity walls between the flange of the cavity and the cavity bottom wall, said cavity mold being formed of a plastic material having similar physical characteristics as polyethylene to afford the aforementioned characteristics of said cavity mold.

References Cited in the file of this patent
UNITED STATES PATENTS

| | | |
|---|---|---|
| 2,182,454 | Sherman | Dec. 5, 1939 |
| 2,227,236 | Vogt | Dec. 31, 1940 |
| 2,412,187 | Wiley | Dec. 3, 1946 |
| 2,433,211 | Gits | Dec. 23, 1947 |
| 2,468,585 | Bluma | Apr. 26, 1949 |
| 2,527,919 | Drangle | Oct. 31, 1950 |
| 2,547,736 | Blake | Apr. 3, 1951 |
| 2,631,939 | Peters | Mar. 17, 1953 |
| 2,649,392 | Marshall | Aug. 18, 1953 |
| 2,657,998 | Peters | Nov. 3, 1953 |
| 2,666,710 | Peters | Jan. 19, 1954 |
| 2,689,183 | Colt | Sept. 14, 1954 |
| 2,736,150 | Loew | Feb. 28, 1956 |
| 2,736,656 | Marshall | Feb. 28, 1956 |
| 2,749,245 | Peters | June 5, 1956 |
| 2,750,294 | Peters | June 12, 1956 |
| 2,752,251 | Peters | June 26, 1956 |